US004001726B2

United States Statutory Invention Registration [19]

[11] Reg. Number: H1726

Chen

[45] Published: May 5, 1998

[54] CFAR TIME-FREQUENCY PROCESSOR FOR SIGNAL DETECTION AND EXTRACTION IN NOISE

[76] Inventor: Victor C. Chen, 2706 Shawn Leigh Dr., Vienna, Va. 22181

[21] Appl. No.: 829,262

[22] Filed: Mar. 31, 1997

[51] Int. Cl.[6] ..... G01S 13/00

[52] U.S. Cl. ..... 342/93

*Primary Examiner*—Daniel T. Pihulic

[57] ABSTRACT

Detection and extraction of unknown signal in noise may be important in radar When an unknown signal of a transient nature is received, representation in terms of basis functions, localized in both time and frequency, such as Gabor representation, may be very useful for signal detection. By using time-frequency decomposition, noise energy tends to spread across entire time-frequency domain, while signal energy often concentrates within a small region with a limited time interval and frequency band. Signal recognition in the time-frequency domain becomes easier than that in either time or frequency domain. By setting a CFAR threshold for and examining time-frequency Gabor coefficients which exceed the threshold, presence of a signal may be determined. CFAR time-frequency processing for detection and extraction of signals in noise improves detection and extraction performance for low Signal-to-noise-ratio (SNR) signals. Due to low SNR, it may be very difficult to identify signals from within either the time or the frequency domain alone. However, in the time-frequency domain, the signal can be easily recognized and its time location and instantaneous frequency can be measured. By performing CFAR thresholding and taking inverse Gabor transform, an unknown signal embedded in noise may be detected and reconstructed with enhanced quality.

9 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

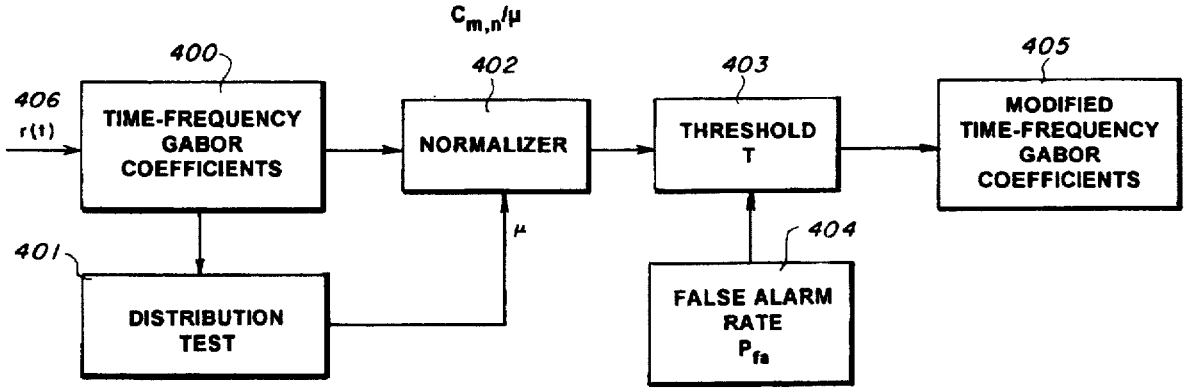

CFAR TIME-FREQUENCY PROCESSOR FOR SIGNAL DETECTION AND EXTRACTION IN NOISE

FIELD OF THE INVENTION

The present invention relates to detection and extraction of unknown signals in noise and enhancing signal to noise characteristics for detected and extracted signals. In particular, the present invention relates to detecting radar signals within an environment containing high background noise levels.

BACKGROUND OF THE INVENTION

Constant False Alarm Rate (CFAR) processing is an optimal way to set up a threshold for detecting signals in a noise laden environment. For signals corrupted by strong background noise, it is often difficult to perform signal detection and parameter estimation in either the time domain or the frequency domain. Signals often concentrate their energies within a limited time interval and a limited frequency band, while background noise often has its energy spread widely into the entire time domain or frequency domain.

A common way to reduce noise in a detected signal is thresholding: after a signal of interest is detected it is transformed into the frequency domain, and "filtered" by discarding all of the frequency bins whose magnitude is below a set threshold. Because noise has a wider bandwidth than any likely signal of interest, doing this typically improves overall signal to noise. One difficulty with thresholding is that in so doing, one inevitably discards some weaker frequency components of the signal, and retains larger components which are predominantly noise. In systems which detect signals in order to determine the presence or absence of a condition, e.g. a military communications system which listens for signals characteristic of an enemy, these thresholding errors cause false alarms, or cause the system to miss legitimate signals. Increasing the filtering threshold will increase misses, but reduce false alarms; decreasing the threshold does the opposite. The algebraic relationship between threshold level and false alarm rate is known, and current practice is to determine the error rate which is tolerable, and then set the threshold accordingly.

Another difficulty with thresholding is that some signals of interest contain frequencies which are not continuously present and indeed may be present only briefly, n.b. frequency-hopping communications signals. Thus the power at such frequencies may be large for a brief time, but total energy at these frequencies may be relatively small compared to noise, which, being continuously present, accumulates continuously throughout signal detection. Therefore, thresholding in the frequency domain may remove the signal in the noise.

In view of these and other limitations of existing methods, it would be desirable for a radar system which would receive statistically non-stationary signals and noise and generate a stable false alarm rate in proportion to the level of noise in the signal background and extract signals in noise. It would be further desirable for a system which would accommodate time-invariance in the received signal.

SUMMARY AND OBJECTS OF THE INVENTION

Accordingly, an object of the invention is to improve the signal to noise ratio of a detected signal.

Another object is to do so in a manner which increases signal to noise of frequency components of the detected signal which are time variant, especially those which are highly localized in time.

In accordance with these and other objects made apparent hereinafter, the invention concerns processing a detected signal by transforming it into the time-frequency domain prior to filtering, rather than just into the frequency domain (e.g. by a Fast Fourier Transform), as is currently the common practice. Noise in the transformed signal is spread over both time and frequency, and thus signal frequencies which existed only briefly during signal detection will stand out more prominently, thus permitting more accurate threshold filtering.

In doing this, one can use any of a number of linear time-frequency transforms thus permitting accurate signal reconstruction in the time domain by use of the inverse Gabor transform. The Gabor transform is preferred because it linear, and has highest joint time-frequency resolution.

DETAILED DESCRIPTION OF THE DRAWINGS

Figure 1:
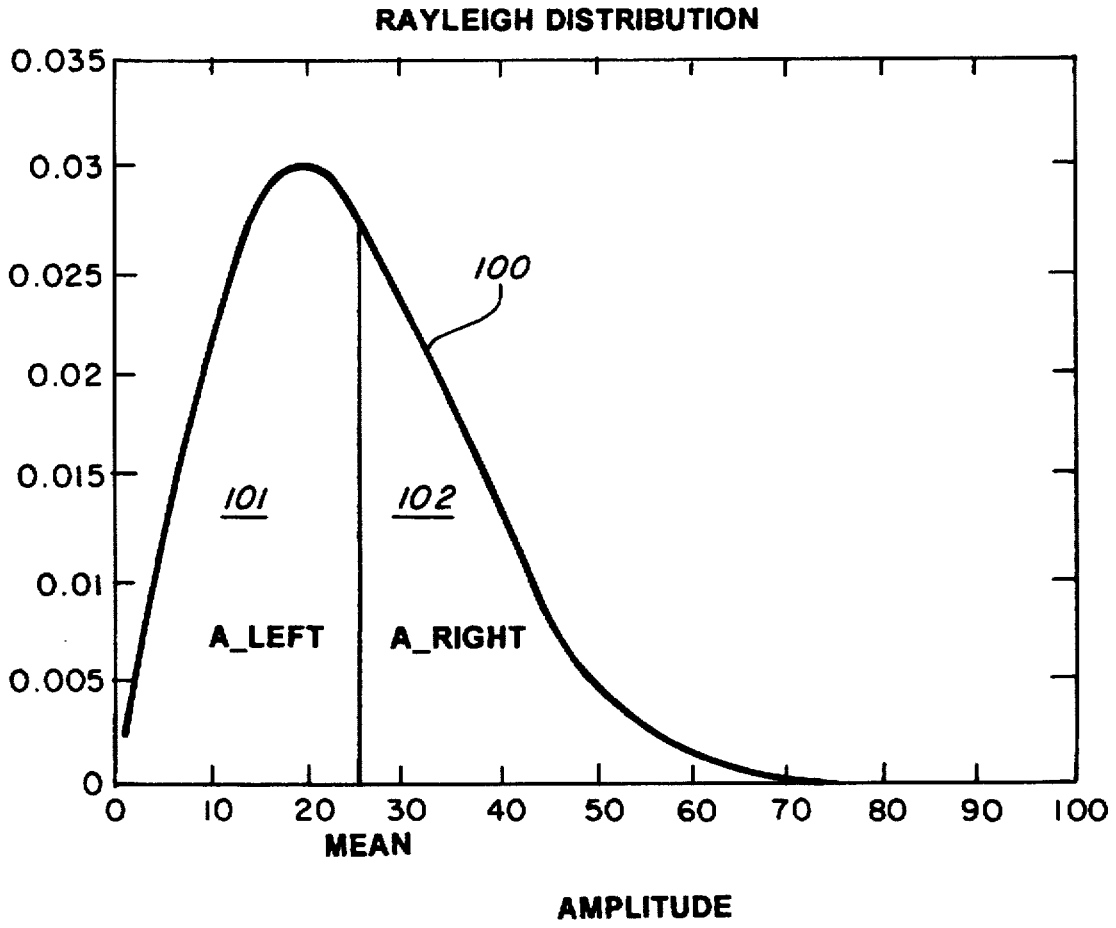
FIG. 1 is graph illustrating a Rayleigh distribution.

Linear time-frequency transforms such as the Gabor transform may be used to decompose a signal into its coefficients in the joint time-frequency domain. If we can distinguish those coefficients which belong to a signal from the coefficients which belong to noise, the signal's coefficients may be utilized to reconstruct a signal by simply taking the inverse transform.

To establish a relationship between time and frequency, a signal should be compared with those basis functions which are concentrated in both the time and the frequency domain. Such comparisons are possible using Gabor functions as described in "Theory of communication", D. Gabor, J.IEE (London), 93(III) (1946) pp. 429–457, incorporated herein by reference. Time-frequency Gabor transforms represent a signal as a linear combination of time-and frequency-shifted Gaussian basis functions h{m,n}(t).

$$s(t)=\Sigma_m\Sigma_n C\{m,n\}h\{m,n\}(t) \quad (1)$$

where m is an integer representing a discrete step along the time axis in the time-frequency domain, and n is a discrete step along the frequency axis in the time-frequency domain.

$$h\{m,n\}(t)=(\pi\sigma^2)^{-1/4}\exp\{-\tfrac{1}{2}\sigma^2(t-Mt)^2+jn\Omega t\} \quad (2)$$

where T and Ω are the respective widths in time and frequency of the time-frequency domain (i.e. each nth time step is T time units long; each nth frequency step is Ω frequency units long, and the choice of T and Ω determines how coarse or fine the transformed data will be). A Gabor transform restricts the sampling cell to $T\Omega=2\pi$, or $$\Omega=2\pi/T \quad (3)$$

From the foregoing, one can see that a Gabor transform is Gaussian. Theoretically, the resolution possible for any Gaussian transform is limited according to the relationship:

$$\Delta_t \Delta_\omega \geqq 1/2 \quad (4)$$

where $\Delta_t$ and $\Delta_{107}$ are the respective resolutions possible on each axis of the transform domain (e.g., here, resolution in time and frequency, respectively.) Thus it is preferred to choose T and $\Delta$ to optimize resolution, i.e. $\Delta_t\ \Delta_{107} = 1/2$.

A primary challenge using Gabor transforms may be computing Gabor coefficients. Gabor coefficients may be defined as described in "Discrete Gabor transform", S. Qian and D. Chen, IEEE Trans. on Signal Processing, 41(7), (1993), pp. 2429–2439 incorporated herein by reference, and "Optimal biorthogonal analysis window function for discrete Gabor transform", S. Qian and D. Chen, IEEE Trans. on Signal Processing, 42(3), (1994) pp. 694-14 687 incorporated herein by reference.

$$C_{m,n} = \int s(t)\gamma^*_{m,n}(t)dt \quad (5)$$

where * indicates complex conjugate, and $$\gamma_{m,n}(t) = \gamma(t-mT)\ \exp\{-jn\Omega t\} \quad (6)$$

and may be a biorthogonal function of $h_{m,n}(t)$:

$$\Sigma_m \Sigma_n \gamma^*_{m,n} h(t')_{m,n}(t) = \delta(t-t') \quad (7)$$

where $\delta(t)$ is the impulse function of t. Thus one can show that:

$$C_{m,n} = \int s(t)\gamma^*(t-mT)\ \exp\{-jn\Omega t\}dt \quad (8)$$

and $$s(t) = \Sigma_m \Sigma_n C_{m,n} h(t-mT)\ \exp\{jn\Omega t\} \quad (9)$$

One advantage of representing signal samples with Gabor basis functions $h_{m,n}(t)$, which are localized in both time and frequency domain, is that noise energy is spread across the entire time-frequency domain while useful signal energy often may be concentrated within a region with a limited time interval and a limited frequency band. Therefore, the signal-to-noise ratio can be enhanced.

In the time-frequency domain, noise has a Rayleigh distribution. For a Rayleigh distribution, it is known that for a given false alarm rate $P_{fa}$, the corresponding threshold rate $T_{fa}$ is:

$$T_{fa} = [2\ \ln\ (1/P_{fa})]^{1/2}$$

An appropriate threshold T is one which produces an acceptable false alarm rate for noise, i.e. an acceptably low number of false alarms due to noise, and an acceptable small number of missing rate when signal is present. FIG. 1 illustrates a Rayleigh distribution 100. Left-side area A_left 101 of the mean is equal to the right-side area, A_right 102. If $C_{m,n}$ is a Gabor transformed signal of interest, then a conventional criterion for applying threshold is that:

$$C_{m,n}/\mu > T_{fa}$$

where $\mu$ is the mean of the Rayleigh distributed noise, and $C_{m,n}$ is the transformed signal strength in the m,nth time-freqency bin. To apply this algorithm, one first calculates $T_{fa}$. Then one estimates $\mu$ (in a manner discussed below). One then filters the signal by discarding all time-frequency bins whose signal $C_{m,n}$ does not meet the above threshold criterion.

Figure 2A:
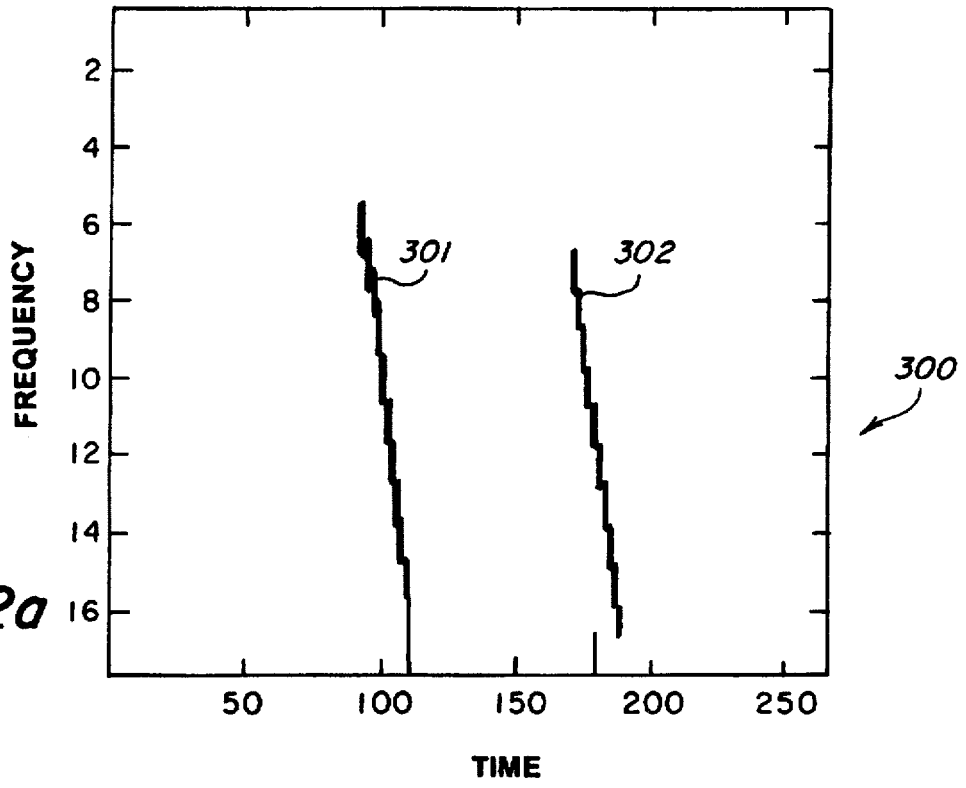
FIG. 2*a* is a time-frequency plot of the coefficients of a detected signal.
Figure 2B:
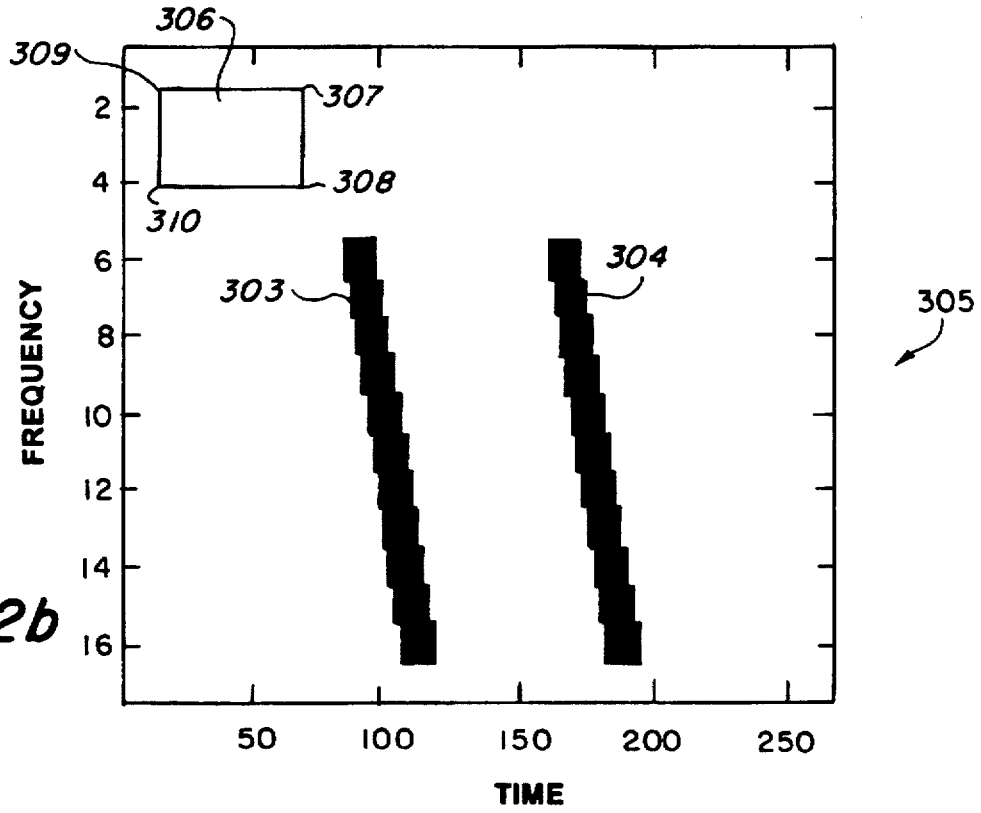
FIG. 2*b* is a time-frequency plot of a time-frequency mask, (i.e. contour in the time-frequency domain circumscribing a portion of the domain).

A preferred way to estimate $\mu$ is best understood in conjunction with FIGS. 2(*a*) and (*b*). Both figures are grey-shading diagrams, which represent a signal transformed into the time-frequency domain, with the time-frequency plane being in the plane of the drawing paper, and intensity of grey indicating signal strength. Very dark areas 301 and 302 correspond to a signal, and the lighter areas correspond to noise. One "masks" the region of the time-frequency domain which plainly contains signal, e.g. using an overly low threshold, identifying all bins which have a larger signal, then surrounding all those bins by an expanded contour or contours (303, 304 in FIG. 2(*b*)) to ensure containment of the signal, locating a portion 306 of the time-frequency domain sufficiently distant from contours 303, 304 to ensure that signal therein is virtually all noise, adding up the total signal within contour 306, and using this and the mathematics of the Rayleigh distribution to calculate $\mu$. This is often called the "four corner" method because contour 306 is chosen as a rectangle (for calculational simplicity), first by selecting tow points 307, 308 distant from contour 303, 304 and then completing the rectangle by choosing two more points 309, 310 even more distant from contours 303, 304. This way to calculate noise is exemplary. In general, any conventional means of noise estimation could be used.

Figure 3:
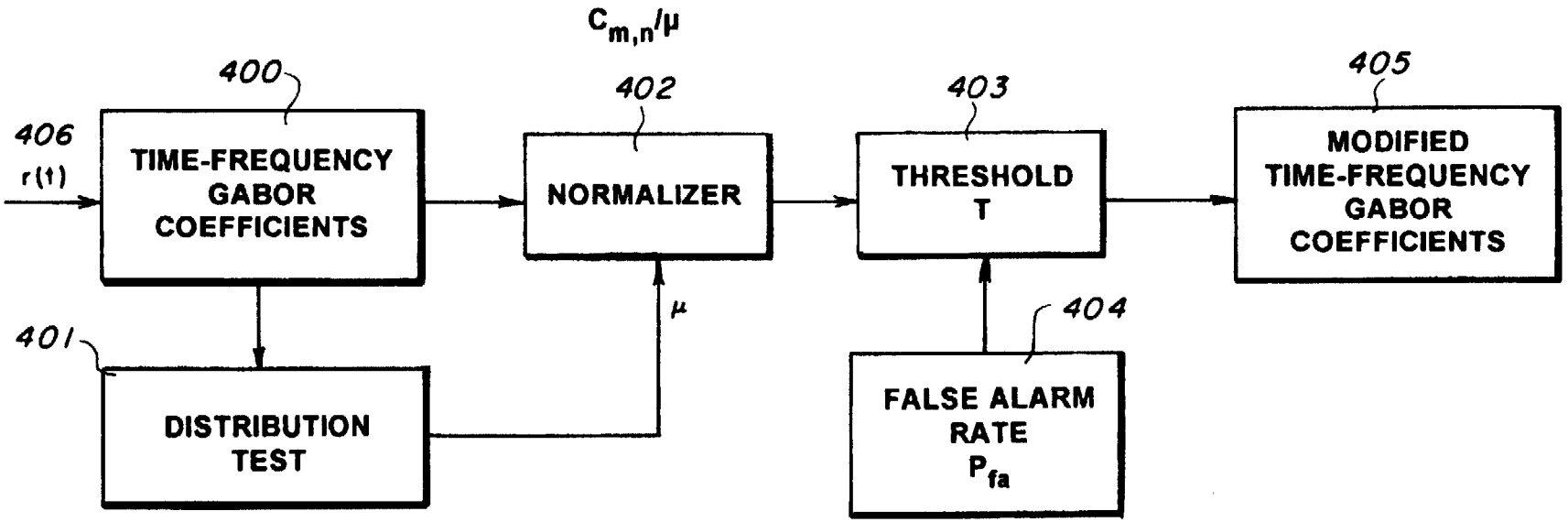
FIG. 3 is a block diagram illustrating a portion of the present invention.

FIG. 3 is a block diagram illustrating the overall process. Noise corrupted time-domain signal r(t) is transformed to the time-frequency domain by processor 400. The transformed signal $C_{m,n}$ is used by processor 401 to determine $\mu$, and also preferably masks an appropriate portion of the time-frequency domain, as above described. Processor 402 normalizes $C_{m,n}$ to $\mu$, and processor 403 determines the threshold T per the above described algorithm therefor, and a preselected false alarm rates $P_{fa}$. The time-frequency bins which survive the thresholding by processor 403 have their respective amplitudes output to member 405 for annunciation or further processing. The signal magnitude in each surviving time-frequency bin represents a Gabor coefficient $C_{m,n}$, from which one can, e.g., reconstruct a filtered signal in the time-domain.

Of especial importance is that this approach is adaptive: because $\mu$ is re-estimated with each detected signal and the transformed signal normalized to $\mu$, the false alarm rate is kept relatively constant.

The invention has been described in what is considered to be the most practical and preferred embodiments. It is recognized, however, that obvious modifications to these embodiments may occur to those with skill in this art. Accordingly, the scope of the invention is to be discerned from reference to the appended claims, wherein:

I claim:

1. In a radar receiver, an improved method for detection and extraction of an unknown information signal and noise comprising:

processing said unknown information signal and said noise received in said receiving step into meaningful information using a series of processing steps comprising:

generating and outputting time-frequency information from said unknown information signal and said noise, processing said time-frequency information using statistical distribution information of said noise and generating noise filtered information, receiving said noise filtered information and said time-frequency information and normalizing said noise filtered information and said time frequency information and outputting normalized information, receiving said normalized information and false alarm rate information and thresholding said normalized information and generating thresholded time-frequency information, and detecting and extracting a noiseless information signal from said threshold time-frequency information.

2. The method of claim 1, wherein said step of generating and outputting time-frequency information further comprises generating actual time-frequency coefficients and outputting said actual time-frequency coefficients.

3. The method of claim 1, wherein said step of receiving and processing said time-frequency information further comprises:

receiving said time-frequency information representative of said unknown information signal and said noise, comparing said time-frequency information with a statistical distribution representative of said noise distribution, and calculating a mean value for said noise.

4. The method of claim 3, wherein said statistical distribution information further comprises a Rayleigh distribution.

5. The method of claim 1, wherein said step of receiving said normalized information and false alarm rate information and thresholding said normalized information further comprises Constant False Alarm Rate thresholding.

6. The method of claim 1, wherein said step of detecting and extracting a noiseless information signal from said thresholded time-frequency information further comprises:

receiving said thresholded time-frequency information, estimating a desired signal corresponding to said thresholded time-frequency information, generating modified time-frequency information corresponding to said desired signal estimated in said estimating step and outputting said modified time-frequency information, and processing said modified time-frequency information and outputting said noiseless target information signal.

7. The method of claim 6, wherein said step of estimating a desired signal corresponding to said thresholded time-frequency information further comprises:

estimating an anticipated signal using a Least Squares approximation, generating approximate time-frequency coefficients for said anticipated signal, comparing said approximate time-frequency coefficients with said actual time-frequency coefficients, optimizing said anticipated signal with respect to said desired signal using results from said comparing step and outputting an optimal anticipated signal, and outputting said desired signal using said optimal anticipated signal derived in said optimizing step.

8. The method of claim 1, wherein said step of generating and outputting time-frequency information from said unknown information and said noise further comprises:

applying a time-frequency transform individually to a plurality of signal inputs having a plurality of scales and outputting a plurality of time-frequency signal outputs, interpolating said plurality of time-frequency signal outputs and outputting a plurality of interpolated signal outputs, and summing said plurality of interpolated signal outputs and outputting an improved time-frequency signal output.

9. A filter comprising:

means for providing a signal of interest in the time domain;

means for producing a transformed signal by transforming said signal of interest into the time-frequency domain, said time-frequency domain having a plurality of time-frequency bins; and means for discarding the portion of said signal in each one of said time-frequency bins in which said portion is less than a preselected threshold.

* * * * *